(12) United States Patent
Vo et al.

(10) Patent No.: US 6,750,264 B2
(45) Date of Patent: Jun. 15, 2004

(54) MULTIMODAL POLYMERIC FOAM CONTAINING AN ABSORBENT CLAY

(75) Inventors: Chau Van Vo, Souffelweyersheim (FR); Simon P. Lee, Buehlertal (DE); Kenji Matsue, Utsunomiya (JP); Itsuki Nakatani, Kanuma (JP)

(73) Assignee: Dow Global Technologies Inc., Midland, MI (US)

( * ) Notice: Subject to any disclaimer, the term of this patent is extended or adjusted under 35 U.S.C. 154(b) by 4 days.

(21) Appl. No.: 10/247,904

(22) Filed: Sep. 20, 2002

(65) Prior Publication Data

US 2003/0130364 A1 Jul. 10, 2003

Related U.S. Application Data

(60) Provisional application No. 60/346,067, filed on Jan. 4, 2002.

(51) Int. Cl.[7] .................... C08J 9/08; C08J 9/12
(52) U.S. Cl. .................... 521/79; 521/83; 521/91
(58) Field of Search ............... 521/79, 83, 91, 521/92

(56) References Cited

U.S. PATENT DOCUMENTS

| | | | |
|---|---|---|---|
| 4,323,528 A | | 4/1982 | Collins |
| 4,455,272 A | | 6/1984 | Schubert et al. |
| 4,559,367 A | | 12/1985 | Hurps et al. |
| 4,990,542 A | | 2/1991 | Motani et al. |
| 5,064,874 A | | 11/1991 | Motani et al. |
| 5,210,105 A | | 5/1993 | Paquet et al. |
| 5,240,968 A | | 8/1993 | Paquet et al. |
| 5,302,634 A | * | 4/1994 | Mushovic |
| 5,332,761 A | | 7/1994 | Paquet et al. |
| 5,369,137 A | | 11/1994 | Paquet et al. |
| 5,369,147 A | * | 11/1994 | Mushovic |
| 5,389,694 A | | 2/1995 | Vo et al. |
| 5,508,315 A | * | 4/1996 | Mushovic |
| 5,589,519 A | | 12/1996 | Knaus |
| 5,650,106 A | * | 7/1997 | Paquet et al. .................. 264/53 |
| 5,659,106 A | * | 8/1997 | Frey et al. |
| 5,710,186 A | * | 1/1998 | Chaudhary |
| 5,986,009 A | | 11/1999 | Thoen et al. |
| 6,069,183 A | * | 5/2000 | Wilkes et al. |
| 6,187,232 B1 | * | 2/2001 | Chaudhary et al. |
| 6,284,842 B1 | | 9/2001 | Ho et al. |
| 6,583,188 B2 | * | 6/2003 | Chaudhary et al. |

FOREIGN PATENT DOCUMENTS

| | | |
|---|---|---|
| EP | 0 353 701 B1 | 4/1997 |
| GB | 1138473 | 1/1969 |
| WO | WO99/54390 | 10/1999 |
| WO | WO01/51551 | 7/2001 |

OTHER PUBLICATIONS

Clay Colloid Chemistry, National Academy of Sciences, Second Edition, H. van Olphen, "Clay Mineralogy" Chapter 5, pp. 57–71.

Encyclopedia Britannica Halloysite, "Clay Minerals", pp. 1–13.

* cited by examiner

*Primary Examiner*—Morton Foelak
(74) *Attorney, Agent, or Firm*—Steven W. Mork

(57) ABSTRACT

Prepare a multimodal polymeric foam from a foamable composition containing a polymer, an absorbent clay, and a blowing agent composition containing water and carbon dioxide and that contains less than 0.2 parts by weight of bentonite based on 100 parts by weight of polymer.

18 Claims, No Drawings

MULTIMODAL POLYMERIC FOAM CONTAINING AN ABSORBENT CLAY

CROSS REFERENCE STATEMENT

This application claims the benefit of U.S. Provisional Application No. 60/346,067, filed Jan. 4, 2002.

BACKGROUND OF THE INVENTION

1. Field of the Invention

The present invention relates to a multimodal polymeric foam containing an absorbent clay and a process for making the same.

2. Description of Related Art

A foam having a multimodal cell size distribution (multimodal foam) offers performance advantages, such as greater toughness and enhanced insulating capability, over a foam of the same polymer composition that has a generally uniform cell size distribution. A foam having a bimodal cell size distribution (bimodal foam) is one type of multimodal foam.

Many methods for preparing multimodal, particularly bimodal, polymeric foam require the presence of water. For example, European patent (EP) 353701 B1 and U.S. Pat. Nos. 4,990,542 and 5,064,874 disclose processes that utilize water in combination with a granular material that adsorbs the water onto its surface. WO 01/51551 A1 discloses a process for preparing bimodal foam that requires water in combination with 0.2 to 10 parts by weight of bentonite in 100 parts by weight of a thermoplastic resin. U.S. Pat. No. 4,559,367 discloses a method of preparing multimodal foam in the presence of organic water-containing vegetable matter. U.S. Pat. Nos. 5,210,105, 5,332,761, and 5,369,137 each disclose a method of preparing bimodal polymeric foams using water, but disclose that pinholes form in cell walls when using greater than three weight-percent (wt %) water based on blowing agent composition or 0.3 weight parts water by per hundred weight parts polymer.

BRIEF SUMMARY OF THE INVENTION

An object of the present invention is to offer a novel process for preparing multimodal polymeric foam, as well as a novel multimodal foam, that offers an alternative, an improvement, or both over existing processes and foams.

In a first aspect, the present invention is a polymeric foam comprising a polymer having multiple cells defined therein and at least one absorbent clay dispersed within said polymer; wherein said foam has a multimodal cell size distribution and contains less than 0.2 parts by weight of bentonite based on 100 parts by weight of polymer. The foam can be substantially, or completely, free of nucleating agents apart from the clay.

In a second aspect, the present invention is a process for preparing the foam of the first aspect comprising (a) preparing a foamable polymer composition by combining a plasticized polymer composition that contains a polymer and at least one absorbent clay with a blowing agent composition comprising 0.5–99.5 weight-percent carbon dioxide and 0.5–80 weight-percent water, based on blowing agent composition weight, at an initial pressure that precludes foaming; and (b) expanding the foamable polymer composition into a polymeric foam containing multiple cells by reducing the pressure from the initial pressure to a lower pressure; wherein said foamable composition contains less than 0.2 parts by weight of bentonite based on 100 parts by weight of polymer and wherein said foam has a multimodal cell size distribution. Water can be present at a concentration of at least 3 weight-percent based on blowing agent weight and at least 0.3 parts per hundred based on polymer weight while less than one percent of the cells contain pinholes.

In a third aspect, the present invention is an article comprising the foam of claim 1.

DETAILED DESCRIPTION OF THE INVENTION

Herein, unless otherwise specified, a material is "essentially free" of a substance if sufficiently little of the substance is present so as not to affect physical properties of the material. Desirably, a material that is essentially free of a substance is free of that substance.

A "multimodal foam" is a foam having a multimodal cell size distribution. A foam has a multimodal cell size distribution if a plot of representative cross-sectional area versus cell size has two or more peaks.

Use a scanning electron microscope (SEM) image of a cross section of a foam to collect cell diameter and representative cross-sectional area data for the foam. The SEM image should be of a sufficient magnification so as to present a representative distribution of the cell sizes in the foam. Measure a cell diameter for each cell in the SEM image. Do not consider faults such as "blow-holes" as cells. Blow holes are spaces defined within a foam that penetrate through multiple cell walls and cell struts and have a plurality of cell wall and cell strut fragments remaining therein. A cell wall is a polymeric film between two cells. A cell strut is a polymeric domain where three or more cells meet.

Calculate cross-sectional area for each cell by assuming a circular cross-section. Estimate an appropriate diameter for non-circular cell cross-sections that will produce an appropriate cross-sectional area (e.g., for oval shaped cells use a diameter mid-way between the largest and smallest diameter). Using the cell diameters, calculate a cross-sectional area for each cell by assuming each cell has a circular cross-section. A convenient program for measuring cell diameters and calculating cross-sectional areas of a digitally scanned image is United States' National Institutes of Health (NIH) public domain NIH IMAGE software (available on the Internet at http://rsb.info.nih.gov/nih-image/). Calculate representative cross-sectional area by multiplying the cross-sectional surface area for a cell of a given size by the number of cells of that size in a SEM image. Measure cell sizes in microns and round to two significant figures. Cell size refers to cell diameter and the two terms are interchangeable herein.

Prepare a plot with cell size along the x-axis and representative surface area on the y-axis. Cells comprising a peak corresponding to the smallest cell size(s) ("small peak") are "small cells" or "secondary cells". Cells comprising a peak corresponding the largest cell size(s) ("large peak") are "large cells" or "primary cells". "Intermediate cells" comprise "intermediate peaks" in between a small peak and a large peak. Similarly, when a small peak and a large peak partially overlap, cells comprising the overlapping region are intermediate cells. Intermediate cells may have properties similar to large cells, small cells, or properties some combination of large and small cells. A "peak" is a point on a plot that has at least one point having a lower y-axis value both prior to and after it, progressing along the plot's x-axis, before there is a point having a higher y-axis value. A peak can comprise more than one point of equal y-axis values (a plateau), provided the point on either side of the plateau (progressing along the plot's x-axis) has a lower y-axis value than the points comprising the plateau.

A multimodal foam can have a "bimodal" cell size distribution. A plot of representative surface area versus cell size for a bimodal foam reveals two peaks, one corresponding to larger primary cells and one corresponding to smaller secondary cells. Generally, primary cells have a cell size of from 0.2 to 2 millimeters (mm), preferably 0.2 to 0.8 mm, more preferably from 0.2 to 0.4 mm. Generally, secondary cells have a cell size of less than 0.2 mm, preferably less than 0.15 mm and more preferably less than 0.1 mm according to ASTM method D-3576.

Generally, less than one percent of the total number of cells in a foam of the present invention contains pinholes. Pinholes are microscopic holes defined within cell walls between contiguous primary cells, contiguous secondary cells, or contiguous primary and secondary cells.

Polymer resins useful for preparing polymeric foams of the present invention are desirably thermoplastic polymer resins. Suitable thermoplastic polymer resins include any extrudable polymer (including copolymers) including semi-crystalline, amorphous, and ionomeric polymers and blends thereof. Suitable semi-crystalline thermoplastic polymers include polyethylene (PE), such as high-density polyethylene (HDPE), and low-density polyethylene (LDPE); polyesters such as polyethylene terephthalate (PET); polypropylene (PP) including linear, branched and syndiotactic PP; polylactic acid (PLA); syndiotactic polystyrene (SPS); ethylene copolymers including ethylene/styrene copolymers (also known as ethylene/styrene interpolymers), ethylene/alpha-olefin copolymers such as ethylene/octene copolymers including linear low density polyethylene (LLDPE), and ethylene/propylene copolymers. Suitable amorphous polymers include polystyrene (PS), polycarbonate (PC), thermoplastic polyurethanes (TPU), polyacrylates (e.g., polymethyl-methacrylate), and polyether sulfone. Preferred thermoplastic polymers include those selected from a group consisting of polymers and copolymers of PS, PP, PE, PC and polyester. Suitable polymer resins include coupled polymers such as coupled PP (see, for example, U.S. Pat. No. 5,986,009 column 16, line 15 through column 18, line 44, incorporated herein by reference), coupled blends of alpha olefin/vinyl aromatic monomer or hindered aliphatic vinyl monomer interpolymers with polyolefins (see, for example, U.S. Pat. No. 6,284,842, incorporated herein by reference), and lightly crosslinked polyolefins, particularly PE (see, for example U.S. Pat. No. 5,589,519, incorporated herein by reference). Lightly crosslinked polyolefins desirably have a composition content of 0.01% or more, preferably 0.1% or more, and 5% or less, preferably 1% or less according to American Society for Testing and Materials (ASTM) method D2765-84.

Foams and processes of the present invention include at least one absorbent clay. An absorbent clay absorbs water into interlayer spacings and, when present in a foamable composition, releases at least a portion of that water as a polymer expands into a foam during foam manufacturing.

An absorbent clay for use in the present invention also desirably has a plasticity index (PI) of less than 500, preferably less than 200, more preferably less than 100, still more preferably less than 75, and greater than zero. A PI is the difference between the wt % of absorbed water necessary for a clay to change to a near liquid state (liquid limit) and the wt % of absorbed water necessary for a clay to become plastic (plastic limit). A PI is a measure of a clay's plastic range breadth. If a clay has a large PI (greater than 500), it can develop an undesirably high viscosity in the presence of water and hinder foam manufacturing.

Absorbent clays are distinct from clays that adsorb water. Clays that adsorb water only take up water onto their surface. Clays for use in the present invention absorb water by taking it up into interlayer spacings in the clay. Release of water absorbed into a clay can be controlled more ways than release of water adsorbed on the surface of a clay, providing absorbent clays an advantage over adsorbing clays. Controlling water release allows control over multimodal cell formation. Examples of clays that are not considered absorbent clays because they tend to adsorb rather than absorb water include mica-illite group three-layer-minerals such as pyrophylite, muskovite, dioktaedric illite, glaukonite, talc, biotite, and dioktaedric illite.

Examples of suitable absorbent clays for use in the present invention include two-layer-minerals of the kaolinite-group such as kaolinite, dickite, halloysite, nakrite, serpentine, greenalithe, berthrierine, cronstedtite, and amesite. Halloysite is a particularly desirable absorbent clay for use in the present invention. Two-layer minerals of the kaolinite group tend to absorb water into interlayer spacings without swelling the clay. Absorbent clays that absorb water without swelling are desirable because they tend to undergo minimal viscosity increase upon absorption of water.

Smectite-group three-layer minerals can also fall within the scope of an absorbent clay. Smectite-group three-layer minerals include dioktaedric vermiculite, dioktaedric smectite, montmorillonite, beidellite, nontronite, volkonskoite, trioctaedric vermiculite, trioctaedric smectite, saponite, hectorite, and saukonite. Smectite-group three-layer minerals tend to swell as they absorb water between their interlayer spaces.

Salt forms of minerals are also included within the scope of absorbent clays. Absorbent clay salts generally have potassium, calcium or magnesium counterions but can also have organic counterions. Certain salt forms of smectite-group three-layer minerals have a plasticity index outside the desired scope of an absorbent clay. For example, sodium montmorillonite has a plastic limit of 97, liquid limit of 700, and a PI of 603.

WO 01/51551 A1 discloses a process for forming bimodal polymeric foam using bentonite at a concentration of 0.2 to 10 parts by weight in 100 parts by weight of a thermoplastic resin. "Bentonite" is a rock whose principle components are montomorillonite salts, particularly sodium montmorillonite. WO 01/51551 A1 (incorporated herein by reference) includes in the definition of bentonite natural bentonite, purified bentonite, organic bentonite, modified montmorillonite such as montorillonite modified with an anionic polymer, montmorillonite treated with a silane, and montmorillonite containing a high polarity organic solvent. Herein, "bentonite" refers to the broad definition used in WO 01/51551 A1. In contrast to teachings in WO 01/51551 A1, multimodal foams of the present invention can be made using less than 0.2 weight parts, preferably less than 0.1 weight parts, more preferably less than 0.05 weight parts of bentonite, based on 100 weight parts of polymer. Foams and process for preparing foams of the present invention can be free of bentonite.

Polymeric foams of the present invention contain absorbent clays at a concentration of 0.01 wt % or more, preferably 0.1 wt % or more, more preferably 0.2 wt % or more and generally 10 wt % or less, preferably 5 wt % or less, and more preferably 3 wt % or less based on polymer resin weight. Generally, suitable absorbent clays have a particle size of 100 micrometers or less, preferably 50 micrometers or less, more preferably 20 micrometers or less. There is no known limit as to how small absorbent clay particles can be for use in the present invention, however the particles typically have a size of one micrometer or more, often 5 micrometers or more. Typically, particle clays having a particle size of 20 micrometers or less are useful for preparing close-celled foams while clays having a particle size of 50 micrometers or greater are useful for preparing open-celled foams. If an absorbent clay swells with water, determine particle size prior to swelling.

Cell-controlling agents (also known as nucleating agents) can be present, but are not necessary for preparing foams of the present invention. Nucleating agents are often useful for controlling cell sizes of smaller cells of a bimodal foam. Examples of typical nucleating agents include talc powder and calcium carbonate powder. Foams and processes of the present invention can be substantially free of nucleating agents apart from the absorbent clay. "Substantially free" means having less than 0.05 weight parts per 100 weight parts of polymer resin. Foams and foam preparation process of the present invention can include 0.02 weight parts or less, even 0.01 weight parts or less of nucleating agents other than the absorbent clay. Foams and foam preparation processes of the present invention can be free of nucleating agents other than the absorbent clay.

Prepare multimodal foams of the present invention, in general, by preparing a foamable polymer composition at an initial pressure and then expanding the foamable polymer composition at a foaming pressure, which is lower than the initial pressure, into a polymeric foam having a multimodal cell size distribution. The foamable polymer composition comprises a mixture of plasticized polymer resin, a blowing agent composition and an absorbent clay that is capable of expanding into a multimodal polymer foam when upon lowering the initial pressure to the foaming pressure. The initial pressure is a pressure sufficient to liquefy the blowing agent composition and to preclude foaming of the foamable polymer composition.

Prepare a foamable polymer composition by blending together components comprising foamable polymer composition in any order. Typically, prepare a foamable polymer composition by plasticizing a polymer resin, blending in an absorbent clay, and then blending in components of a blowing agent composition at an initial pressure. A common process of plasticizing a polymer resin is heat plasticization, which involves heating a polymer resin enough to soften it sufficiently to blend in a blowing agent composition, an absorbent clay, or both. Generally, heat plasticization involves heating a thermoplastic polymer resin to or near to its glass transition temperature ($T_g$), or melt temperature ($T_m$) for crystalline polymers.

Addition of an absorbent clay can occur at any point prior to foaming the foamable polymer composition. For example, an artisan can blend polymer resin and an absorbent clay together while polymerizing the polymer resin, during a melt-blending procedure with a polymer resin but prior to initiating a foaming process (e.g., making polymer pellets containing an absorbent clay), or during a foaming process.

Blowing agent compositions for use in the present invention comprise $CO_2$ and water, and can contain additional blowing agent components. $CO_2$ is present at a concentration of 0.5 wt % or more, preferably 10 wt % or more, more preferably 20 wt % or more and 99.5 wt % or less, preferably 98 wt % or less, and more preferably 95 wt % or less based on blowing agent composition weight. Water is present at a concentration of 0.5 wt % or more, preferably 3 wt % or more, and 80 wt % or less, more preferably 50 wt % or less, and more preferably 20 wt % or less based on blowing agent composition weight.

Additional blowing agents can be present at a concentration ranging from 0 wt % to 80 wt %, based on blowing agent composition weight. Preferably, less than 40 wt % of the blowing agent composition is selected from a group consisting of dimethyl ether, methyl ether, and diethyl ether. Suitable additional blowing agents include physical and chemical blowing agents. Suitable physical blowing agents include HFCs such as methyl fluoride, difluoromethane (HFC-32), perfluoromethane, ethyl fluoride (HFC-161), 1,1-difluoroethane (HFC-152a), 1,1,1-trifluoroethane (HFC-143a), 1,1,2,2-tetrafluoroethane (HFC-134), 1,1,1,2-tetrafluoroethane (HFC-134a), pentafluoroethane (HFC-125), perfluoroethane, 2,2-difluoropropane (HFC-272fb), 1,1,1-trifluoropropane (HFC-263fb), and 1,1,1,2,3,3,3-heptafluoropropane (HFC-227ea); liquid hydrofluorocarbons such as 1,1,1,3,3-pentafluoropropane (HFC-245fa), and 1,1,1,3,3-pentafluorobutane (HFC-365mfc); hydrofluoroether; inorganic gases such as argon, nitrogen, and air; organic blowing agents such as aliphatic hydrocarbons having from one to nine carbons ($C_1$–$C_9$) including methane, ethane, propane, n-butane, isobutane, n-pentane, isopentane, neopentane, cyclobutane, and cyclopentane; fully and partially halogenated aliphatic hydrocarbons having from one to four carbons ($C_1$–$C_4$) including aliphatic and cyclic hydrocarbons; and aliphatic alcohols having from one to five carbons ($C_1$–$C_5$) such as methanol, ethanol, n-propanol, and isopropanol; carbonyl containing compounds such as acetone, 2-butanone, and acetaldehyde. Suitable chemical blowing agents include azodicarbonamide, azodiisobutyronitrile, benzenesulfo-hydrazide, 4,4-oxybenzene sulfonyl semi-carbazide, p-toluene sulfonyl semi-carbazide, barium azodicarboxylate, N,N'-dimethyl-N,N'-dinitrosoterephthalamide, trihydrazino triazine and sodium bicarbonate.

$CO_2$, water, and any additional blowing agents account for 100 wt % of a blowing agent composition for use in the present invention. A blowing agent composition is typically present at a concentration of 3 parts per hundred (pph) or more, preferably 4 pph or more, more preferably 5 pph or more and typically 18 pph or less, preferably 15 pph or less, and more preferably 12 pph or less based on polymer resin weight.

One desirable blowing agent composition for use in the present invention contains $CO_2$ and water, and is essentially free of additional blowing agents, meaning that the blowing agent composition comprises 1 wt % or less, preferably 0.5 wt % or less, more preferably 0.1 wt % or less, still more preferably zero wt % of additional blowing agent based on blowing agent composition weight.

Another desirable blowing agent composition consists essentially of carbon dioxide, water, and ethanol. Ethanol is useful to reduce foam density and increase foam cell sizes over foams prepared with blowing agents without ethanol.

Still another desirable blowing agent composition consists essentially of $CO_2$, water, a $C_1$–$C_5$ hydrocarbon, and, optionally, ethanol. The hydrocarbon in this particular blowing agent composition can be halogen-free or can be a hydrofluorocarbon. Preferably, select the hydrocarbon from a group consisting of isobutane, cyclopentane, n-pentane, isopentane, HFC-134a, HFC-235fa, and HFC-365mfc. The hydrocarbon serves to reduce the thermal conductivity of a resulting foam over a foam prepared without such a hydrofluorocarbon. Examples of such blowing agent compositions include $CO_2$, water, and at least one of cyclopentane, n-pentane, and isopentane, HFC-134a, HFC-245fa, and HFC-365mfc; and $CO_2$, water, ethanol and at least one of isobutane, cyclopentane, n-pentane, isopentane, HFC-134a, HFC-245fa, and HFC-365mfc.

One hypothesis for how multimodal foams form according to the present invention is that the absorbent clay absorbs water in the blowing agent composition in such a manner so as to delay release (and subsequent expansion) of the water until after the $CO_2$ has begun expanding. Delaying expansion of the water during foaming until after $CO_2$ expansion begins effectively causes formation of multiple cells having smaller sizes than cells resulting from $CO_2$ expansion. Water release from an absorbent clay is controllable by an absorbent clay's affinity for water (binding energy) as well as the size and tortuosity of the clay's interlayer spaces within which water absorbs.

A foamable polymer composition can contain additional additives such as pigments, fillers, antioxidants, extrusion aids, stabilizing agents, antistatic agents, fire retardants, acid scavengers, and thermally insulating additives. One desirable embodiment includes thermally insulating additives such as carbon black, graphite, silicon dioxide, metal flake or powder, or a combination thereof in the foamable polymer composition and foam of the present invention. Add additional additives to a polymer, polymer composition, or foamable polymer composition at any point in the foaming process prior to reducing a foamable polymer composition from an initial pressure to a foaming pressure, preferably after plasticizing a polymer and prior to adding a blowing agent.

Foam preparation processes of the present invention include batch, semi-batch, and continuous processes. Batch processes involve preparation of at least one portion of the foamable polymer composition in a storable state and then using that portion of foamable polymer composition at some future point in time to prepare a foam. For example, prepare a portion of a foamable polymer composition containing an absorbent clay and polymer resin by heat plasticizing a polymer resin, blending in an absorbent clay to form a polymer/clay blend, and then cooling and extruding the polymer/clay blend into pellets. Use the polymer/clay blend pellets later to prepare a foamable polymer composition and expand into a foam.

A semi-batch process involves preparing at least a portion of a foamable polymer composition and intermittently expanding that foamable polymer composition into a foam all in a single process. For example, U.S. Pat. No. 4,323,528, herein incorporated by reference, discloses a process for making polyolefin foams via an accumulating extrusion process. The process comprises: 1) mixing a thermoplastic material and a blowing agent composition to form a foamable polymer composition; 2) extruding the foamable polymer composition into a holding zone maintained at a temperature and pressure which does not allow the foamable polymer composition to foam; the holding zone has a die defining an orifice opening into a zone of lower pressure at which the foamable polymer composition foams and an openable gate closing the die orifice; 3) periodically opening the gate while substantially concurrently applying mechanical pressure by means of a movable ram on the foamable polymer composition to eject it from the holding zone through the die orifice into the zone of lower pressure, and 4) allowing the ejected foamable polymer composition to expand to form the foam.

A continuous process involves forming a foamable polymer composition and then expanding that foamable polymer composition in a non-stop manner. For example, prepare a foamable polymer composition in an extruder by heating a polymer resin to form a molten resin, blending into the molten resin an absorbent clay and blowing agent composition at an initial pressure to form a foamable polymer composition, and then extruding that foamable polymer composition through a die into a zone at a foaming pressure and allowing the foamable polymer composition to expand into a multimodal foam. Desirably, cool the foamable polymer composition after addition of the blowing agent and prior to extruding through the die in order to optimize foam properties. Cool the foamable polymer composition, for example, with heat exchangers.

Foams of the present invention can be of any form imaginable including sheet, plank, rod, tube, beads, or any combination thereof. Included in the present invention are laminate foams that comprise multiple distinguishable longitudinal foam members that are bound to one another. Laminate foams include coalesced foams that comprise multiple coalesced longitudinal foam members. Longitudinal foam members typically extend the length (extrusion direction) of a coalesced polymeric foam. Longitudinal foam members are strands, sheets, or a combination of strands and sheets. Sheets extend the full width or height of a coalesced polymeric foam while strands extend less than the full width and/or height. Width and height are orthogonal dimensions mutually perpendicular to the extrusion direction (length) of a foam. Strands can be of any cross-sectional shape including circular, oval, square, rectangular, hexagonal, or star-shaped. Strands in a single foam can have the same or different cross-sectional shapes. Longitudinal foam members can be solid foam or can be hollow, such as hollow foam tubes (see, for example, U.S. Pat. No. 4,755,408; incorporated herein by reference). The foam of one preferred embodiment of the present invention comprises multiple coalesced foam strands.

Preparing coalesced polymeric foams typically involves extruding a foamable polymer composition containing polymer resin and a blowing agent formulation through a die defining multiple holes, such as orifices or slits. The foamable polymer composition flows through the holes, forming multiple streams of foamable polymer composition. Each stream expands into a foam member. "Skins" form around each foam member. A skin can be a film of polymer resin or polymer foam having a density higher than an average density of a foam member it is around. Skins extend the full length of each foam member, thereby retaining distinguishability of each foam member within a coalesced polymeric foam. Foam streams contact one another and their skins join together during expansion, thereby forming a coalesced polymeric foam.

Other methods are available for joining longitudinal foam members together to form a foam including use of an adhesive between foam members and coalescing foam members together after they are formed by orienting the members and then applying sufficient heat, pressure, or both to coalesce them together. Similar processes are suitable for forming bead foam, which comprises multiple foam beads partially coalesced together. Bead foam is also within the scope of the present invention.

Foams of the present invention contain residual blowing agents, including $CO_2$ and water, when fresh. Fresh, herein, means within one day, preferably within one hour, more preferably immediately after manufacturing. Foams of the present invention can also contain residuals of additional blowing agents if they were present during foam preparation.

Foams of the present invention typically have a density of 16 kilograms per cubic meter ($kg/m^3$) or more, more typically 20 $kg/m^3$ or more, and still more typically 24 $kg/m^3$ or more and 64 $kg/m^3$ or less, preferably 52 $kg/m^3$ or less, and more preferably 48 kg/m³ or less. Determine foam density according to ASTM method D-1622.

Foams of the present invention can be open-celled or close-celled. Open-celled foams have an open cell content of 20% or more while close-celled foams have an open cell content of less than 20%. Determine open cell content according to ASTM method D-6226. Desirably, the present foams are close-celled foams.

Foams of the present invention are particularly useful as thermal insulating materials and desirably have a thermal conductivity of 30 milliwatts per meter-Kelvin (mW/m-K) or less, preferably 25 mW/m-K or less (according to ASTM method C-518 at 24° C.). Foams of the present invention also preferably include a thermally insulating additive. Articles, such as thermally insulating containers, that contain foams of the present invention are also part of the present invention's scope.

The following examples serve to further illustrate the present invention without unduly limiting the scope of the invention.

EXAMPLE (EX) 1

Create a dry blend containing 100 weight-parts of a PS resin (weight-averaged molecular weight (Mw)=152,000; polydispersity (Mw/Mn)=3.4; z-average molecular weight (Mz)=320,000), 0.7 weight-parts of halloysite clay (from Plainsman Company), 0.5 weight-parts of additives consisting of barium stearate and PE. Feed the dry blend into an extruder of an extrusion foam line and melt-blend the PS resin, clay, barium stearate, and PE in the extruder at a temperature of 240° C. Add 4.7 weight-parts, per hundred parts PS, (or 4.7 pph based on PS weight) of a blowing agent composition consisting of 85 wt % $CO_2$ and 15 wt % water, based on blowing composition weight, to form a foamable polymer composition. Add the blowing agent composition at a pressure of 17.4 MPa. Cool the foamable polymer composition to a temperature of 120° C. and extrude through a slit die, using a 9.8 MPa die pressure, into atmospheric pressure and form into a foam board using polytetrafluorethylene coated parallel forming plates (or rollers). The foamable polymer composition expands at atmospheric pressure to form a multimodal polymeric foam (Ex 1) having a bimodal cell size distribution.

Ex 1 illustrates a bimodal PS foam of the present invention prepared using $CO_2$ and water as a blowing agent. Ex 1 has an average primary cell diameter of 0.4 mm and an average secondary cell diameter of 80 microns; pinholes in less than one percent of the cells; and a density of 44.1 kg/m³ (ASTM method D-1622). Determine cell size using ASTM method D-3576.

EX 2

Feed 100 weight-parts of PS (Mw=145,000; Mw/Mn=3.3; Mz=320,000), 0.6 weight parts of additional additives consisting of barium stearate, PE, and copper phthalocyanine color concentrate (12 wt % copper phthalocyanine in PS), and 0.7 weight parts halloysite clay (Plainsman Company) into a two-inch (5.1 centimeter) extruder. Melt-blend these components at 220° C. to form a polymer composition. Transport the polymer composition into a mixer and add 7.1 pph of a blowing agent composition, based on PS weight, at 11 MPa to form a foamable polymer composition. The blowing agent composition consists of 50 wt % $CO_2$, 8 wt % water, 27 wt % n-butane, and 15 wt % iso-butane with wt % values relative to total blowing agent composition weight. Cool the foamable polymer composition to 120° C. and extrude through a slit die, at a die pressure of 8.1 MPa, to atmospheric pressure. Shape the extruded foamable polymer composition into foam board using parallel polytetrafluoroethylene-coated forming plates (or rollers) to obtain Ex 2.

Ex 2 illustrates a PS foam of the present invention prepared using n-butane and iso-butane as additional blowing agents in the blowing agent composition. Ex 2 has a bimodal cell size distribution, having primary cell sizes of approximately 0.23 mm and secondary cell sizes of approximately 50 microns; cells with less than one percent the having pinholes; a density of 38.6 kg/m³; and a thermal conductivity of 31 milliwatts per meter-Kelvin (mW/m-K) seven days after manufacture according to ASTM method C-518 at 24° C.

EX 3

Prepare Ex 3 by repeating the procedure for preparing Ex 2 except use 5.6 pph of a blowing agent composition, based on PS weight, consisting of 88 wt % $CO_2$ and 12 wt % water, based on blowing agent composition weight. Add blowing agent at 14.9 MPa and use a die pressure of 9.6 MPa. Determine weight parts relative to PS weight and wt % relative to blowing agent composition weight.

Ex 3 illustrates a PS foam of the present invention prepared with a blowing agent composition consisting of $CO_2$ and water. Ex 3 has a thermal conductivity below 30 mW/m-K. Ex 3 has an average primary cell size of 0.22 mm and an average secondary cell size of 50 microns (ASTM method D-3576); pinholes in less than one percent of the cells; a density, without skin, of 30.1 kg/m³ (ASTM method D-1622) and a fresh thermal conductivity of 28 mW/m-K (ASTM method C-518 at 24° C.).

EX 4

Prepare Ex 4 by repeating the procedure for preparing Ex 2 except: (1) use 7.2 pph of a blowing agent composition, based on PS weight, consisting of 14 wt % $CO_2$, 10 wt % water, 56 wt % isobutane, and 21 wt % ethanol (wt % is relative to blowing agent composition weight); and (2) use a PS that has a Mw of 200,000 and a polydispersity of 2.3. Add blowing agent at 12.5 MPa and use a die pressure of 5.3 MPa.

Ex 4 illustrates a PS foam of the present invention prepared using a blowing agent composition containing isobutane and ethanol as additional blowing agents. Ex 4 has a bimodal cell size distribution with an average primary cell size of 0.3 mm and an average secondary cell size of 50 microns (ASTM method D-3576); pinholes in less than one percent of the cells; a density, without skin, of 34 kg/m³ (ASTM method D-1622); and a fresh thermal conductivity of 25.4 mW/m-K (ASTM method C-518 at 24° C.).

EX 5

Prepare Ex 5 similarly to Ex 4 except: (1) use a 7 pph, based on PS weight, of blowing agent composition consisting of 19 wt % $CO_2$, 10 wt % water, 50 wt % isobutane, and 21 wt % ethanol; and (2) include 5 weight parts of carbon black (SEVACARB® N990, SEVACARB is a trademark of Columbian Chemicals). Weight parts are relative to weight parts of PS and wt % are relative to blowing agent composition weight. Add blowing agent at a pressure of 12.7 MPa and use a die pressure of 5.8 MPa.

Ex 5 illustrates a bimodal PS foam of the present invention. Ex 5 has primary cells with an average cell size of 0.34 mm and secondary cells having an average cell size of 60 microns; pinholes in less than one percent of the cells; a density, without its skin, of 34 kg/m³ (ASTM method D-1622); and a fresh thermal conductivity of 24 mW/m-K (ASTM method C-518 at 24° C.).

EX 6

Prepare Ex 6 in a manner similar to Ex 1 except use a polymer blend having a Mw of 170,000, a polydispersity of 3.2, and that includes 3 weight-parts of hexabromocyclododecane (HBCD), 0.1 weight-parts of an acid magnesium oxide and 0.7 weight-parts of additive consisting of barium stearate, colorant and PE.

Add blowing agent to a concentration of 6.5 pph, based on polymer blend weight. The blowing agent composition consists of 38 wt % $CO_2$, 9 wt % water, 38 wt % isobutane, and 15 wt % cyclopentane. Wt % is relative to blowing agent composition weight.

Prepare foams (i)–(v) and comparative foams (a) and (b) by incorporating 0.6 weight-parts clay, based on 100 weight parts of polymer blend. The clays for foams (i)–(v) are absorbent while the clays for (a) and (b) are not. Table I indicates the clays for each foam and whether the foam is multimodal or not. Ex 6 illustrates that only the absorbent clays produce a foam with a multimodal cell size distribution.

TABLE I

| Foam | Name | Trade-name | Supplier | density | Dual cell |
|---|---|---|---|---|---|
| (i) | Halloysite | Troy-clay | Plainsman | 33.1 | yes |
| (ii) | Kaolinite | China Clay Supreme | Imerys | 34.3 | yes |
| (iii) | Sepiolite, hydrated magnesium silicate | Pangel S-9 | Tolsa | 37.1 | yes |
| (iv) | Laponite, hydrous sodium Lithium magnesium silicate | Laponite RD | Laporte | 35.5 | yes |
| (v) | Sodium Magadiite | — | CR-PQ Corp | 36.9 | yes |
| (a) | Talc | — | Servimin | 40.7 | no |
| (b) | Magnesium silicate | — | Servimin | 40.7 | no |

EX 7

Prepare Ex 7 similar to Ex 2 except use the blowing agent compositions in Table II to produce foams (vi)–(x), all of which have a multimodal cell size distribution. In Table II, "weight-parts based on 100 weight parts polymer" and "pph" are interchangeable.

Foams (vi)–(x) have a primary cell size of 0.19–0.47 millimeters, and average secondary cell size of 50–100 microns (ASTM method D-3576); and pinholes in less than one percent of the cells.

Ex 7 illustrates that liquid hydrofluorocarbon blowing agents are useful for preparing multimodal foam having low density, excellent compressive strength and excellent thermal insulation performance.

TABLE II

| | | Foam | | | | |
|---|---|---|---|---|---|---|
| | | (vi) | (vii) | (viii) | (ix) | (x) |
| Total BA | pph | 7.4 | 8.6 | 7.5 | 8.5 | 8.1 |
| CO2 | wt % of blowing agent | 24 | 21 | 24 | 21 | 20 |
| H2O | wt % of blowing agent | 8 | 9 | 9 | 8 | 7 |
| cyclopentane | wt % of blowing agent | | | | 24 | |
| n-pentane | wt % of blowing agent | 27 | | | | |
| HFC-134a | wt % of blowing agent | 41 | 47 | 40 | 47 | 49 |
| HFC-365mfc | wt % of blowing agent | | 23 | | | |
| HFC-245fa | wt % of blowing agent | | | 27 | | |
| Ethanol | wt % of blowing agent | | | | | 25 |
| Halloysite Clay | pph | 0.6 | 0.6 | 0.6 | 0.6 | 0.85 |
| HBCD pure | pph | 0.0 | 2.5 | 2.5 | 2.5 | 2.5 |
| FPC3 T | ° C. | 118 | 121 | 121 | 121 | 122 |
| Mixer pressure | bar | 126 | 111 | 135 | 130 | 129 |
| Die Pressure | bar | 77 | 64 | 69 | 78 | 88 |
| Foam properties | | | | | | |
| thickness | mm | 30 | 25 | 34 | 35 | 30 |
| Density w/o skin | kg/m3 | 35.7 | 38.1 | 34.4 | 30.8 | 29.9 |
| Large Cell size V | mm | 0.31 | 0.19 | 0.24 | 0.42 | 0.47 |
| Small Cell V | mm | 0.07 | 0.06 | 0.07 | 0.10 | 0.10 |
| % 2nd cell size | % | 63 | 9 | 13 | 20 | 59 |
| Compressive strength | kPa | 406 | 481 | 484 | 326 | 289 |
| Lambda 10C, 90d | mW/m-K | 29.8 | 28.3 | 30.1 | 29.3 | 29.1 |

What is claimed is:

1. A polymeric foam comprising a polymer having multiple cells defined therein and at least one absorbent clay dispersed within said polymer; wherein said foam has a multimodal cell size distribution and contains less than 0.2 parts by weight of bentonite based on 100 parts by weight of polymer.

2. The foam of claim 1, wherein said foam is substantially free of nucleating agents apart from said clay.

3. The foam of claim 1, wherein less than one percent of said cells contain pinholes.

4. The foam of claim 1, wherein said foam has primary cells having a cell size of 0.2 to 2 millimeters and secondary cells having a cell size of less than 0.2 millimeters with cell sizes determined according to ASTM method D-3576.

5. The foam of claim 1, wherein said clay is selected from a group consisting of kaolinite-group two-layer-minerals, smectite-group three-layer-minerals, and salts thereof.

6. The foam of claim 1, wherein said clay is halloysite.

7. The foam of claim 1, wherein said polymer is selected from a group consisting of polymers and copolymers of polystyrene, polypropylene, polyethylene, polycarbonate, and polyester.

8. The foam of claim 1, wherein said foam, when fresh, contains carbon dioxide, water, and at least one additional blowing agent.

9. The foam of claim 1, wherein said foam, when fresh, contains carbon dioxide and water and is essentially free of any additional blowing agents.

10. The foam of claim 1, further comprising a thermally insulating additive.

11. A process for preparing the foam of claim 1, comprising:
   (a) preparing a foamable polymer composition by combining a plasticized polymer composition that contains a polymer and at least one absorbent clay with a blowing agent composition comprising 0.5–99 weight-percent carbon dioxide and 0.5–80 weight-percent water, based on blowing agent composition weight, at an initial pressure that precludes foaming; and
   (b) expanding the foamable polymer composition into a polymeric foam containing multiple cells by reducing the pressure from the initial pressure to a lower pressure;
wherein said foamable composition contains less than 0.2 parts by weight of bentonite based on 100 parts by weight of polymer and said foam has a multimodal cell size distribution.

12. The process of claim 11, wherein the water is present at a concentration of at least 3 weight-percent based on blowing agent weight and at least 0.3 parts per hundred based on polymer weight while less than one percent of said cells have pinholes.

13. The process of claim 11, wherein said blowing agent composition further comprises at least one additional blowing agent.

14. The process of claim 13, wherein said additional blowing agent is selected from a group consisting of ethanol, propane, n-butane, isobutane, cyclopentane, n-pentane, isopentane, 1,1,1,2-tetrafluoroethane, 1,1,1,3,3-pentafluoropropane, and 1,1,1,3,3-pentafluorobutane.

15. The process of claim 11, wherein said polymer is selected from a group consisting of polymers and copolymers of polystyrene, polypropylene, polyethylene, polycarbonate, and polyester.

16. The process of claim 11, wherein said clay is selected from a group consisting of kaolinite-group two layer-minerals, smectite-group three-layer-minerals, and, salts thereof.

17. The process of claim 11, wherein said foamable composition further comprises a thermally insulating additive.

18. An article comprising the foam of claim 1.

* * * * *